(12) United States Patent
Lin et al.

(10) Patent No.: US 8,985,784 B2
(45) Date of Patent: Mar. 24, 2015

(54) LIGHT SOURCE MODULE AND MICRO PROJECTOR USING THE SAME

(75) Inventors: Chia-Yuan Lin, Hsinchu (TW); Cheng-Chung Hsu, Hsinchu (TW); Meng-Che Lin, Hsinchu (TW); Chuan Lee, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 515 days.

(21) Appl. No.: 13/547,140

(22) Filed: Jul. 12, 2012

(65) Prior Publication Data

US 2014/0016106 A1 Jan. 16, 2014

(51) Int. Cl.
*G03B 21/20* (2006.01)
*F21V 14/02* (2006.01)
*F21V 14/06* (2006.01)
*F21Y 101/02* (2006.01)

(52) U.S. Cl.
CPC ............... *F21V 14/02* (2013.01); *G03B 21/20* (2013.01); *F21V 14/06* (2013.01); *F21Y 2101/025* (2013.01)
USPC ........................................................ 353/87

(58) Field of Classification Search
CPC .. G03B 21/206; G03B 21/2033; H01S 3/025; H01L 27/14601; H04N 1/0249; G02B 19/0052
See application file for complete search history.

(56) References Cited

U.S. PATENT DOCUMENTS

2006/0227817 A1 * 10/2006 Chang ............................... 372/9
2006/0268423 A1 * 11/2006 Ho ................................. 359/641

* cited by examiner

*Primary Examiner* — Sultan Chowdhury
*Assistant Examiner* — Danell L Owens
(74) *Attorney, Agent, or Firm* — McClure, Qualey & Rodack, LLP

(57) ABSTRACT

A light-source module including a light-source holder, a light source, a collimator lens holder, a collimator lens, a fasten member and an elastic member is suitable for being disposed in a housing. The light-source holder having a convex portion engaged with a concave portion of the housing is adapted to rotate about an axis. The light source disposed in the light-source holder emits a light beam along a beam path. The collimator lens is disposed in the collimator lens holder disposed in the light source holder on the beam path and a distance is maintained between the light source and the collimator lens. When fastened into a positioning hole of the housing, the fasten member pushes the light-source holder to rotate about the axis and the light-source holder presses the elastic member leaned against the light-source holder.

20 Claims, 4 Drawing Sheets

LIGHT SOURCE MODULE AND MICRO PROJECTOR USING THE SAME

BACKGROUND OF THE INVENTION

1. Field of the Invention

The present invention generally relates to a light source module. More particularly, the present invention relates to a light source module and a micro projector using the same.

2. Description of Related Art

A projector is a display device for producing large-size images. An imaging principle of the projector is to convert an illuminating beam produced by a light source module to an image beam through a light valve, and projecting the image beam to a screen or a wall through a lens, to form an image. With the progress of the projecting technology and the reducing of the manufacturing cost, the use of the projector has been expanded from commercial use to domestic use.

A micro projector is similar to a conventional projector but has a smaller size and a lighter weight therefore can be integrated into a mobile device, such as a cell phone or a digital camera. The micro projection techniques currently adopted by micro projectors include a liquid crystal display (LCD) technique, a digital light processing (DLP) technique, a liquid crystal on silicon (LCoS) technique, and a micro electro mechanical systems (MEMS) micro scanner technique.

The light source of a projection apparatus may be a RGB light emitting diode (LED), or RGB laser diode (LD), etc. In existing micro projection systems, laser light sources in red, green, and blue colors are usually used as the light sources to provide rich colors. Taking the micro projectors adopting MEMS technique for example, a collimator lens is arranged in front of the laser light source and on a beam path of the light beam for collimating the light beam as a parallel light beam and the collimated light beam is reflected by the mirrors and filters so as to project the laser onto the micro mirror of the MEMS to project images with micro scanner technique. The RGB light sources alignment is thus critical for projecting quality of the micro-projection. Also, for better resolution of projection, the size of the light spot of RGB laser diode should be under 80 μm. Therefore, how to design a micro adjustment mechanism for precisely aligning the RGB light sources within limited space has become an important issue for people in the industry.

SUMMARY OF THE INVENTION

Accordingly, the present invention is directed to a light source module which can be precisely adjusted within limited space.

The present invention is directed to a micro projector which the light source module thereof can be precisely adjusted within limited space.

The present invention provides a light source module suitable for being disposed in a housing having at least one concave portion. The light source module comprises a light source holder, a light source, a collimator lens holder, a collimator lens, at least one fasten member and at least one elastic member. The light source holder has at least one convex portion corresponding to the at least one concave portion, wherein the at least one convex portion is engaged with the at least one concave portion, and is adapted to rotate about at least one rotating axis. The light source is disposed in the light source holder for emitting a light beam along a beam path. The collimator lens holder is disposed in the light source holder. The collimator lens is disposed in the collimator lens holder, wherein the collimator lens is located on the beam path and a distance is maintained between the light source and the collimator lens. The at least one fasten member is adapted to be fastened into a positioning hole of the housing. The at least one elastic member is fixed to the housing and leaned against the light source holder. When the fasten member is fastened into the positioning hole, the fasten member pushes the light source holder to rotate about the rotating axis to a desired angle, and the light source holder presses the elastic member, so an elastic force of the elastic member pushes the light source holder against the fasten member.

The present invention provides a micro projector. The micro projector comprises a housing and at least one light source module. The housing comprises at least one concave portion and at least one positioning hole. The at least one light source module is dispose in the housing. Each of the at least one light source module comprises a light source holder, a light source, a collimator lens holder, a collimator lens, at least one fasten member and at least one elastic member. The light source holder has at least one convex portion corresponding to the at least one concave portion. Each of the at least one convex portion is engaged with the corresponding concave portion, and is adapted to rotate about at least one rotating axis. The light source is disposed in the light source holder for emitting a light beam along a beam path. The collimator lens holder is disposed in the light source holder. The collimator lens is disposed in the collimator lens holder. The collimator lens is located on the beam path and a distance is maintained between the light source and the collimator lens. The at least one fasten member is adapted to be fastened into the corresponding positioning hole. The at least one elastic member is fixed to the housing and leaned against the light source holder. When the fasten member is fastened into the positioning hole, the fasten member pushes the light source holder such that the light source holder rotates about the rotating axis to a desired angle, and the light source holder presses the elastic member, so an elastic force of the elastic member pushes the light source holder against the fasten member.

According to an embodiment of the present invention, the convex portion is located at a bottom surface of the light source housing corresponding to the concave portion and the light source housing has an extended portion. The elastic member is leaned against a top surface of the light source holder. When the fasten member is fasten into the positioning hole, the fasten member pushes the extended portion toward a fastening direction, so the light source holder rotate about the rotating axis to the desired angle.

According to an embodiment of the present invention, the convex portion is located at a first side surface of the light source housing corresponding to the concave portion. The elastic member is leaned against a second side surface of the light source holder. When the fasten member is fasten into the positioning hole, the fasten member pushes the second side surface of the light source holder to rotate about the rotating axis to the desired angle.

According to an embodiment of the present invention, the at least one convex portion comprises a first convex portion and a second convex portion. The first convex portion is located at a bottom surface of the light source housing. The second convex portion is located at a first side surface of the light source housing. The at least one concave portion comprises a first concave portion and a second concave portion located correspondingly to the first convex portion and the second convex portion respectively. The light source housing is adapted to rotate about a first rotating axis and a second rotating axis.

According to an embodiment of the present invention, the at least one elastic member comprises a first elastic member and a second elastic member. The at least one fasten member comprises a first fasten member and a second fasten member. The first elastic member is leaned against a top surface of the light source holder. The second elastic member is leaned against a second side surface of the light source holder. When fasten into a first positioning hole of the housing, the first fasten member pushes an extended portion of the light source housing toward a fasten direction, so the light source holder rotates about the first rotating axis to a first desired angle. When fasten into the second positioning hole, the second fasten member pushes the second side surface of the light source holder to rotate about the second rotating axis to a second desired angle.

According to an embodiment of the present invention, the first rotating axis is perpendicular to the second rotating axis.

According to an embodiment of the present invention, the light source holder further comprises an alignment slot. The collimator lens holder comprises an alignment hole corresponding to the alignment slot. The collimator lens is slidably disposed in the light source holder along an alignment direction. The light source holder further comprises a lock member passing through the alignment slot and engaged with the alignment hole to lock the relatively movement between the collimator lens holder and the light source holder.

According to an embodiment of the present invention, the alignment direction is perpendicular to the rotating axis.

According to an embodiment of the present invention, the light source includes laser diode.

According to an embodiment of the present invention, the fasten member includes screw, and the positioning hole includes screw hole.

According to an embodiment of the present invention, the micro projector further comprises a standard light source module. The standard light source module comprises a standard light source holder, a standard light source, a standard collimator lens holder and a standard collimator lens. The standard light source holder is fixed in the housing. The standard light source is disposed in the standard light source holder for emitting a standard light beam along a standard beam path. The standard collimator lens holder is fixed in the housing in front of the standard light source. The standard collimator lens is disposed in the standard collimator lens holder. The standard collimator lens is located on the standard beam path and a distance is maintained between the standard light source and the standard collimator lens.

According to an embodiment of the present invention, the at least one light source module comprises two light source modules. The micro projector further comprises a mirror assembly disposed along the beam paths of the light source modules. Each of the fasten members pushes the corresponding light source holder to rotate about the corresponding rotating axis to the corresponding desired angle where the light beams of the light source modules are reflected by the mirror assembly to make the beam paths thereof coincide with the standard beam path.

According to an embodiment of the present invention, the micro projector further comprises an elastic member fixed to the housing and leaned against a top surface of the standard light source module.

Based on the above description, the angle of the light beam from the light source can be adjusted about the rotating axes by the convex portions of the light source holder engaged with the concave portions of the housing. Moreover, the distance between the collimator lens and the light source can be adjusted by the alignment hole of the collimator lens holder corresponding to the alignment slot of the light source holder. Also, due to the direct contact of the convex portions and the concave portions the heat generated by the light source can be dissipated via the housing. Therefore, the present invention not only precisely adjusts the angle of the light beam of the light source module within limited space, also improves the heat dissipation efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
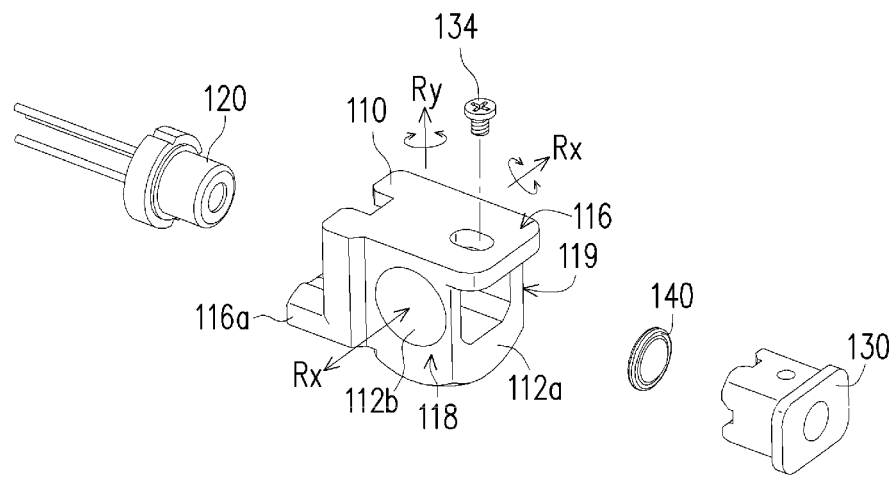
FIG. 1 is an exploded view of a light source module according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
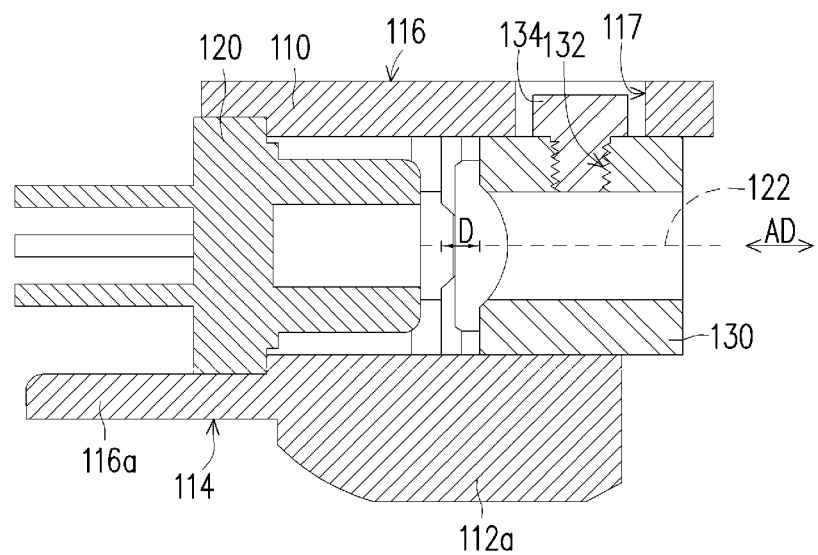
FIG. 2 is an cross-sectional view of a light source module according to an embodiment of the present invention.
Figure 3:
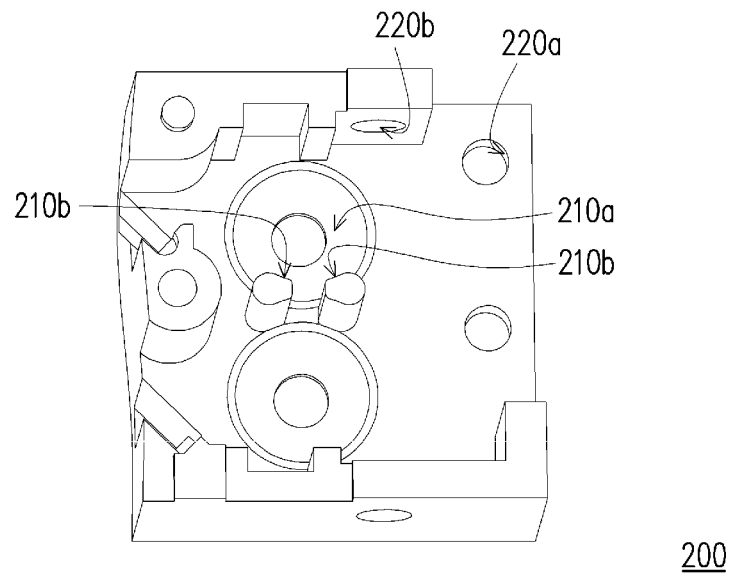
FIG. 3 is a schematic view of a housing according to an embodiment of the present invention.

FIG. 1 is an exploded view of a light source module according to an embodiment of the present invention. FIG. 2 is a cross-sectional view of a light source module according to an embodiment of the present invention. FIG. 3 is a schematic view of a housing according to an embodiment of the present invention. Referring to FIG. 1 to FIG. 3, the light source module 100 is suitable for being disposed in a housing 200. The housing 200 has at least one concave portions 210*a*, 210*b* (two are illustrated in FIG. 3). The light source module 100 includes a light source holder 110, a light source 120, a collimator lens holder 130 and a collimator lens 140. The light source holder 110 has at least one convex portions 112*a*, 112*b* (two are illustrated in FIG. 1) corresponding to the concave portions 210*a*, 210*b* respectively. In the present embodiment, the convex portion 112*a* is located at a bottom surface 114 of the light source holder 110 corresponding to the concave portion 210*a*. The convex portion 112*b* is located at a first side surface 118 of the light source holder 110 corresponding to the concave portion 210*b*. The convex portions 112*a*, 112*b* is engaged with the concave portions 210*a*, 210*b*, so that the light source holder 110 is adapted to rotate about at least one rotating axis Rx, Ry (two are illustrated in FIG. 1). In the present embodiment, the rotating axes includes a first rotating axis Rx and a second rotating axis Ry corresponding to the convex portions 112a, 112b respectively. The first rotating axis Rx is perpendicular to the second rotating axis Ry.

The light source 120 is disposed in the light source holder 110 for emitting a light beam along a beam path 122 as shown in FIG. 2, so the light beam 122 from the light source 120 can rotate with the light source holder 110 to a desired angle. In the present embodiment, the light source 120 is laser diode, but the invention is not limited thereto. The collimator lens 140 is disposed in the collimator lens holder 130 and the collimator lens holder 130 is disposed in the light source holder 110. The collimator lens 140 is located on the beam path 122 and a distance D is formed between the light source 120 and the collimator lens 140 for collimating the light beam from the light source 120 as a parallel light beam. The distance D herein is the distance from the light emitting point of the light source 120 to the center of the collimator lens 140 as shown in FIG. 2.

The distance D between the light source 120 and the collimator lens 140 controls the size of the light spot of the light source. For better resolution, the alignment for maintaining the distance D between the light source 120 and the collimator lens 140 is required. For the purpose stated above, in the present embodiment, the light source holder 110 further includes an alignment slot 117 and the collimator lens holder 130 further includes an alignment hole 132 corresponding to the alignment slot 117. The collimator lens holder 130 is slidably disposed in the light source holder 110. In the present embodiment, the light source 120 is fixed in the light source holder 110 by dispensing process, so the light source 120 is the alignment reference for the collimator lens 140. The collimator lens holder 130 can be slide along an alignment direction AD to adjust the distance D between the light source 120 and the collimator lens 140 in the collimator lens holder 130. The alignment direction AD is perpendicular to the first rotating axis Rx and the second rotating axis Ry. A lock member 134 passes through the alignment slot 117 and then is engaged with the alignment hole 132 to lock the relatively movement between the collimator lens holder 130 and the light source holder 110 so as to finish the focusing between the collimator lens 140 and the light source 120. In the present embodiment, the distance D is about ±0.3 mm, but the invention is not limited thereto.

Figure 4:
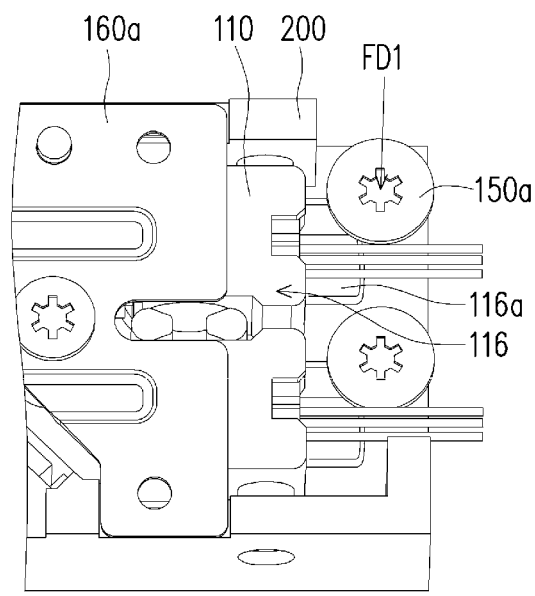
FIG. 4 is a schematic view of a light source module assembled to a housing according to an embodiment of the present invention.
Figure 5:
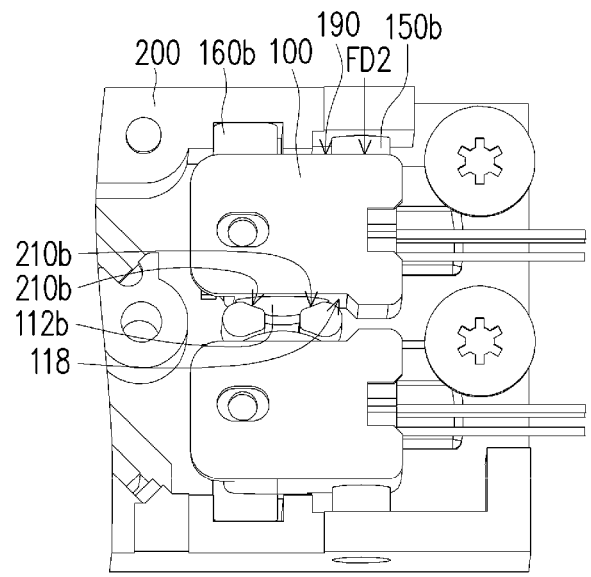
FIG. 5 is an another schematic view of a light source module assembled to a housing according to an embodiment of the present invention.

FIG. 4 is a schematic view of a light source module assembled to a housing according to an embodiment of the present invention. FIG. 5 is an another schematic view of a light source module assembled to a housing according to an embodiment of the present invention. Referring to FIG. 4 and FIG. 5, the light source module 100 further includes at least one fasten member 150a, 150b and at least one elastic member 160a, 160b. For adjusting the light beam of the light source module 100 about the first rotating axis Rx, firstly referring to FIG. 4, the fasten member 150a is adapted to be fastened into a positioning hole 220a (as shown in FIG. 3) of the housing 200. In the present embodiment, the fasten member 150a includes screw, and the positioning hole 220a includes screw hole. The elastic member 160a is fixed to the housing 200 and leaned against a top surface 116 of the light source holder 110. The light source holder 100 further includes an extended portion 116a. When the fasten member 150a is fastened into the positioning hole 220a (as shown in FIG. 3) along a fasten direction FD1, the fasten member 150a pushes the extended portion 116a toward the fasten direction FD1, so the light source holder 110 rotates about the first rotating axis Rx to a desired angle. At the time, the light source holder 110 pushes the elastic member 160a which is leaned against the top surface 116 of the light source holder 110, so an elastic force of the elastic member 160a pushes the light source holder 110 against the fasten member 150a. Therefore, the light source module 100 can be fixed at the desired angle without keeping on rotating.

Now referring to FIG. 5, for adjusting the light beam of the light source module 100 about the second rotating axis Ry, the elastic member 160b is leaned against a second side surface 119 of the light source holder 110, so when the fasten member 150b is fasten into a second positioning hole 220b (as shown in FIG. 3) along a fasten direction FD2, the fasten member 150b pushes the second side surface 119 of the light source holder 110 to rotate about the second rotating axis Ry to the desired angle. At the time, the light source holder 110 pushes the elastic member 160b which is leaned against the second side surface 119 of the light source holder 110, so an elastic force of the elastic member 160b pushes the light source holder 110 against the fasten member 150b. Therefore, the light source module 100 can be fixed at the desired angle without keeping on rotating.

It is noted that, in the present embodiment, two convex portions 112a, 112b and two corresponding concave portions 210a, 210b are illustrated, however, in other embodiments of the invention, the light source holder 110 can only have either one of the convex portions 112a/112b and the housing 200 only has the corresponding concave portion 210a/210b. The present invention does not limit the number of the convex portions and the corresponding concave portions, and the number of the elastic member and the fasten member depends on the number of the convex portions and the corresponding concave portions.

With the above mentioned design, the angle of the light beam from the light source 120 can be adjusted about the rotating axes Rx, Ry by the convex portions 112a, 112b of the light source holder 110 engaged with the concave portions 210a, 210b of the housing 200. Moreover, the distance D between the collimator lens 140 and the light source 120 can be adjusted by the alignment hole 132 of the collimator lens holder 130 corresponding to the alignment slot 117 of the light source holder 110. Also, due to the direct contact of the convex portions 112a, 112b and the concave portions 210a, 210b, the heat generated by the light source 120 can be dissipated via the housing 200.

Figure 6:
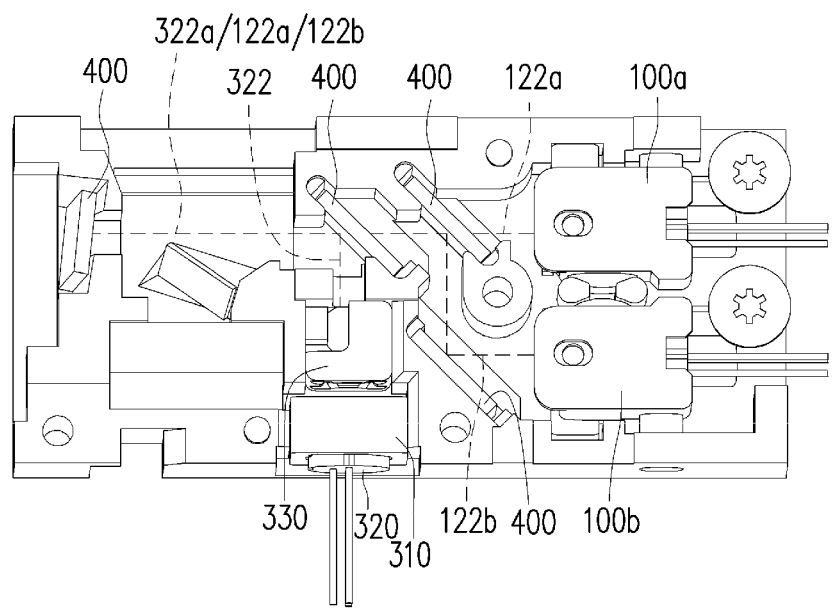
FIG. 6 is a schematic view of a micro projector according to an embodiment of the present invention.

FIG. 6 is a schematic view of a micro projector according to an embodiment of the present invention. Referring to FIG. 6, the light source module 100 described above can be used in a micro projector 10, and the housing 200 is the casing of the micro projector 10. The micro projector 10 includes the housing 200 and at least one light source module 100a and 100b (two are illustrated herein). The light source module 100a and 100b and the housing 200 of the present embodiment are substantially the same with the above mentioned light source module 100 and the housing 200. Also, the light source module 100 and the housing 200 are capable of achieving similar effects as the light source module 100 and the housing 200 mentioned before. The similar parts thereof are omitted from further description.

Figure 7:
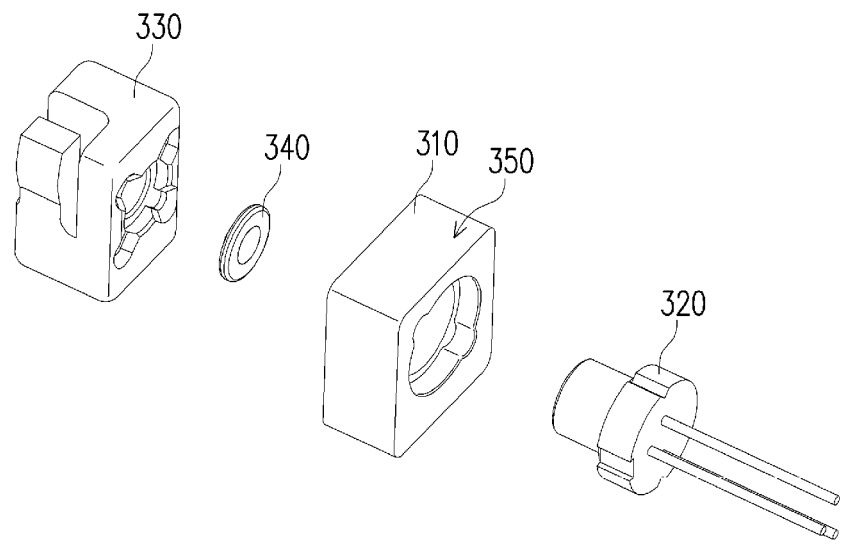
FIG. 7 is an exploded view of a standard light source module according to an embodiment of the present invention.

FIG. 7 is an exploded view of a standard light source module according to an embodiment of the present invention. Referring to FIG. 6 and FIG. 7, in the present embodiment, the micro projector 10 includes a first light source module 100a and a second light source module 100b. The design of the first light source module 100a and the second light source module 100b are substantially the same, except the color of the light source can be different. In the present embodiment, the light source of the first light source module 100a is, for example, a green laser diode, and the light source of the second source module 100b is, for example, a blue laser diode, but the invention is not limited herein. In the present embodiment, the micro projector 10 further includes a standard light source module 300, and the standard light source module 300 includes a standard light source holder 310, a standard light source 320, a standard collimator lens holder 330 and a standard collimator lens 340. The standard light source holder 310 is fixed in the housing 200 by dispensing process. The standard light source 320 is fixed in the standard light source holder 310, also by dispensing process, for emitting a standard light beam along a standard beam path 322. In the present embodiment, the standard light source 320 is, for example, a red laser diode. The standard collimator lens holder 330 is firstly alignment with the standard light source holder 310 for maintaining a distance between the standard light source 320 and the standard collimator lens 340, and then fixed to the housing 200.

The micro projector 10 further comprises a mirror assembly 400 disposed along the beam paths of the light source modules 100a, 100b and the standard light source module 300. Each of the fasten members 150a, 150b (as shown in FIG. 4 and FIG. 5) pushes the corresponding light source holder 100a/100b to rotate about the corresponding rotating axes Rx, Ry to the corresponding desired angle where the light beams of the light source modules 100a, 100b are reflected by the mirror assembly 400 to make the beam paths 122a, 122b thereof coincide with the reflected standard beam path 322a.

Figure 8:
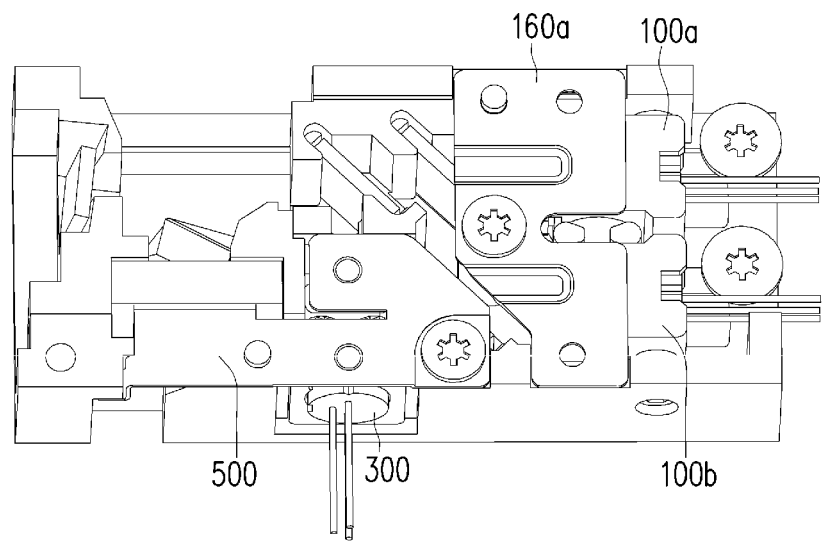
FIG. 8 is a schematic view of a micro projector according to an embodiment of the present invention.

FIG. 8 is a schematic view of a micro projector according to an embodiment of the present invention. In the present embodiment, the micro projector 10 further comprises an elastic member 500 fixed to the housing 200 and leaned against a top surface 350 of the standard light source module 300 to fix the vertical movement of the standard light source module 300. For the light source module 100a, 100b, the elastic member 160a also can achieve the similar effect of fixing the vertical movement of the light source module 100a, 100b.

In sum, the angle of the light beam from the light source can be adjusted about the rotating axes by the convex portions of the light source holder engaged with the concave portions of the housing. Moreover, the distance between the collimator lens and the light source can be adjusted by the alignment hole of the collimator lens holder corresponding to the alignment slot of the light source holder. Also, due to the direct contact of the convex portions and the concave portions the heat generated by the light source 120 can be dissipated via the housing. Therefore, the present invention not only precisely adjusts the angle of the light beam of the light source module within limited space, also improves the heat dissipation efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source module, suitable for being disposed in a housing, the housing having at least one concave portion, comprising:
   a light source holder, having at least one convex portion corresponding to the at least one concave portion, wherein the at least one convex portion is engaged with the at least one concave portion, and is adapted to rotate about at least one rotating axis;
   a light source, disposed in the light source holder for emitting a light beam along a beam path;
   a collimator lens holder, disposed in the light source holder;
   a collimator lens, disposed in the collimator lens holder, wherein the collimator lens is located on the beam path and a distance is maintained between the light source and the collimator lens;
   at least one fasten member, adapted to be fastened into a positioning hole of the housing; and
   at least one elastic member, fixed to the housing and leaned against the light source holder; when the fasten member is fastened into the positioning hole, the fasten member pushes the light source holder to rotate about the rotating axis to a desired angle and the light source holder presses the elastic member, so an elastic force of the elastic member pushes the light source holder against the fasten member.

2. The light source module as recited in claim 1, wherein the convex portion is located at a bottom surface of the light source holder corresponding to the concave portion, and the light source holder has an extended portion, wherein the elastic member is leaned against a top surface of the light source holder, and when the fasten member is fasten into the positioning hole, the fasten member pushes the extended portion toward a fastening direction, so the light source holder rotates about the rotating axis to the desired angle.

3. The light source module as recited in claim 1, wherein the convex portion is located at a first side surface of the light source holder corresponding to the concave portion, and the elastic member is leaned against a second side surface of the light source holder, wherein when the fasten member is fasten into the positioning hole, the fasten member pushes the second side surface of the light source holder to rotate about the rotating axis to the desired angle.

4. The light source module as recited in claim 1, wherein the at least one convex portion comprises a first convex portion and a second convex portion, wherein the first convex portion is located at a bottom surface of the light source housing, and the second convex portion is located at a first side surface of the light source housing, wherein the at least one concave portion comprises a first concave portion and a second concave portion located correspondingly to the first convex portion and the second convex portion respectively, wherein the light source housing is adapted to rotate about a first rotating axis and a second rotating axis.

5. The light source module as recited in claim 4, wherein the at least one elastic member comprises a first elastic member and a second elastic member, and the at least one fasten member comprises a first fasten member and a second fasten member, wherein the first elastic member is leaned against a top surface of the light source holder, and the second elastic member is leaned against a second side surface of the light source holder, wherein when fasten into a first positioning hole of the housing, the first fasten member pushes an extended portion of the light source housing toward a fasten direction, so the light source holder rotates about the first rotating axis to a first desired angle, and when fasten into the second positioning hole, the second fasten member pushes the second side surface of the light source holder to rotate about the second rotating axis to a second desired angle.

6. The light source module as recited in claim 4, wherein the first rotating axis is perpendicular to the second rotating axis.

7. The light source module as recited in claim 1, wherein the light source holder further comprises an alignment slot, the collimator lens holder comprises an alignment hole corresponding to the alignment slot, the collimator lens is slidably disposed in the light source holder along an alignment direction, wherein the light source holder further comprises a lock member passing through the alignment slot and engaged with the alignment hole to lock the relatively movement between the collimator lens holder and the light source holder.

8. The light source module as recited in claim 1, wherein the alignment direction is perpendicular to the rotating axis.

9. The light source module as recited in claim 1, wherein the light source includes laser diode.

10. The light source module as recited in claim 1, wherein the fasten member includes screw, and the positioning hole includes screw hole.

11. A micro projector, comprising:
 a housing, comprising at least one concave portion and at least one positioning hole; and
 at least one light source module, dispose in the housing and each of the at least one light source module comprising:
  a light source holder, having at least one convex portion corresponding to the at least one concave portion, wherein each of the at least one convex portion is engaged with the corresponding concave portion, and is adapted to rotate about at least one rotating axis;
  a light source, disposed in the light source holder for emitting a light beam along a beam path;
  a collimator lens holder, disposed in the light source holder;
  a collimator lens, disposed in the collimator lens holder, wherein the collimator lens is located on the beam path and a distance is maintained between the light source and the collimator lens;
  at least one fasten member, adapted to be fastened into the corresponding positioning hole; and
  at least one elastic member, fixed to the housing and leaned against the light source holder; wherein when the fasten member is fastened into the positioning hole, the fasten member pushes the light source holder such that the light source holder rotates about the rotating axis to a desired angle, and the light source holder presses the elastic member, so an elastic force of the elastic member pushes the light source holder against the fasten member.

12. The micro projector according to claim 11, wherein the convex portion is located at a bottom surface of the light source holder corresponding to the concave portion, and the light source holder has an extended portion leaning on the housing, wherein the elastic member is leaned against a top surface of the light source holder, and when the fasten member is fasten into the corresponding positioning hole, the fasten member pushes the extended portion toward a fastening direction, so the light source holder rotate about the rotating axis to the desired angle.

13. The micro projector according to claim 11, wherein the convex portion is located at a first side surface of the light source housing corresponding to the concave portion, and the elastic member is leaned against a second side surface of the light source holder, wherein when the fasten member is fasten into the positioning hole, the fasten member pushes the second side surface of the light source holder to rotate about the rotating axis to the desired angle.

14. The micro projector according to claim 11, wherein the at least one convex portion comprises a first convex portion and a second convex portion, wherein the first convex portion is located at a bottom surface of the light source housing, and the second convex portion is located at a first side surface of the light source housing, wherein the at least one concave portion comprises a first concave portion and a second concave portion located correspondingly to the first convex portion and the second convex portion respectively, so the light source housing is adapted to rotate about a first rotating axis and a second rotating axis.

15. The micro projector according to claim 14, wherein the at least one elastic member comprises a first elastic member and a second elastic member, and the at least one fasten member comprises a first fasten member and a second fasten member, wherein the first elastic member is leaned against a top surface of the light source holder, and the second elastic member is leaned against a second side surface of the light source holder, wherein when the first fasten member is fasten into a first positioning hole of the housing, the first fasten member pushes an extended portion of the light source housing so the light source holder rotates about the first rotating axis to a first desired angle, and when the second fasten member is fasten into the second positioning hole, the second fasten member pushes the second side surface of the light source holder to rotate about the second rotating axis to a second desired angle.

16. The micro projector according to claim 14, wherein the first rotating axis is perpendicular to the second rotating axis.

17. The micro projector according to claim 11, further comprising a standard light source module, the standard light source module comprising:
 a standard light source holder, fixed in the housing;
 a standard light source, disposed in the standard light source holder for emitting a standard light beam along a standard beam path;
 a standard collimator lens holder, fixed in the housing in front of the standard light source; and
 a standard collimator lens, disposed in the standard collimator lens holder, wherein the standard collimator lens is located on the standard beam path and a distance is maintained between the standard light source and the standard collimator lens.

18. The micro projector according to claim 11, wherein the at least one light source module comprises two light source modules, the micro projector further comprises a mirror assembly disposed along the beam paths of the light source modules, each of the fasten members pushes the corresponding light source holder to rotate about the corresponding rotating axis to the corresponding desired angle where the light beams of the light source modules are reflected by the mirror assembly to make the beam paths thereof coincide with the standard beam path.

19. The micro projector according to claim 17, further comprising an elastic member, fixed to the housing and leaned against a top surface of the standard light source module.

20. The micro projector according to claim 11, wherein the light source includes laser diode.

* * * * *